(12) United States Patent
Harai

(10) Patent No.: US 10,698,574 B2
(45) Date of Patent: Jun. 30, 2020

(54) DISPLAY CONTROL PROGRAM, DISPLAY CONTROL METHOD, AND DISPLAY CONTROL APPARATUS

(71) Applicant: FUJITSU LIMITED, Kawasaki-shi, Kanagawa (JP)

(72) Inventor: Natsuki Harai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 273 days.

(21) Appl. No.: 15/983,977

(22) Filed: May 18, 2018

(65) Prior Publication Data

US 2018/0341375 A1    Nov. 29, 2018

(30) Foreign Application Priority Data

May 29, 2017  (JP) ................... 2017-105567

(51) Int. Cl.

| | |
|---|---|
| G06F 3/0482 | (2013.01) |
| G06F 3/0484 | (2013.01) |
| G06F 3/147 | (2006.01) |
| G06F 3/0488 | (2013.01) |
| G06T 7/20 | (2017.01) |
| G06F 3/0354 | (2013.01) |

(52) U.S. Cl.
CPC ........ *G06F 3/0482* (2013.01); *G06F 3/04845* (2013.01); *G06F 3/04883* (2013.01); *G06F 3/04886* (2013.01); *G06F 3/147* (2013.01); *G06F 3/03542* (2013.01); *G06T 7/20* (2013.01); *G06T 2207/30241* (2013.01); *G09G 2354/00* (2013.01)

(58) Field of Classification Search
None
See application file for complete search history.

(56) References Cited

U.S. PATENT DOCUMENTS

| 8,423,916 B2 | 4/2013 | Chihara et al. |
| 8,952,994 B2 | 2/2015 | Takeda |

(Continued)

FOREIGN PATENT DOCUMENTS

| JP | 2003-233446 A | 8/2003 |
| JP | 2007-233511 A | 9/2007 |

(Continued)

*Primary Examiner* — Tuan S Nguyen
(74) *Attorney, Agent, or Firm* — Westerman, Hattori, Daniels & Adrian, LLP

(57) ABSTRACT

A display control method executed by a computer includes selecting an object from among a plurality of objects displayed in a display area in response to detecting a specific operation, obtaining first identification information corresponding to the selected object, and positional relationship information that represents a positional relationship between the objects by referring to a storage that stores information regarding the objects, displaying the obtained first identification information in the display area, identifying another object from among the objects in response to receiving a designation of a direction, based on the selected object, the obtained positional relationship information, and the designated direction, obtaining second identification information corresponding to the identified another object, and displaying the obtained second identification information in the display area.

8 Claims, 13 Drawing Sheets

(56) References Cited

U.S. PATENT DOCUMENTS

2009/0089694 A1* 4/2009 Mori ................... A63F 13/10
 715/764
2013/0263056 A1* 10/2013 Son ..................... G09G 5/14
 715/838
2016/0291800 A1 10/2016 Okabayashi et al.

FOREIGN PATENT DOCUMENTS

| JP | 2010-122987 A | 6/2010 |
| JP | 2013-54405 A | 3/2013 |
| JP | 2016-194894 A | 11/2016 |

* cited by examiner

FIG.3

| OPERATION ID | TRAJECTORY | OPERATION |
|---|---|---|
| C1 | TRAJECTORY 1 | DISPLAY THUMBNAIL |
| C2 | TRAJECTORY 2 | CREATE TAG |
| C3 | TRAJECTORY 3 | CLOSE |

| OBJECT ID | NAME | LAYER | COORDINATES | WIDTH | TYPE | CONTENT | OWNER | ASSOCIATED SCREEN | SITE |
|---|---|---|---|---|---|---|---|---|---|
| O1 | TAG 1 | 1 | (3000, 300) | (300, 300) | TAG | TEXT 1 | USER 1 | SCREEN 1 | SITE 1 |
| O2 | IMAGE 1 | 2 | (100, 500) | (800, 400) | IMAGE | C:¥IMAGE¥IMAGE 1.png | USER 1 | SCREEN 1 | SITE 1 |
| O3 | TAG 2 | 3 | (920, 600) | (300, 200) | TAG | HANDWRITTEN IMAGE 1 | USER 2 | SCREEN 1 | SITE 1 |
| O4 | TAG 3 | 4 | (880, 750) | (400, 300) | TAG | TEXT 2 | USER 1 | SCREEN 1 | SITE 1 |

| THUMBNAIL ID | OBJECT ID | THUMBNAIL |
|---|---|---|
| D1 | O2 | THUMBNAIL IMAGE 1 |
| D2 | O3 | THUMBNAIL IMAGE 2 |
| D3 | O1 | THUMBNAIL IMAGE 3 |
| D4 | O4 | THUMBNAIL IMAGE 4 |

| ADJOINING OBJECT ID | REFERENCE OBJECT | RIGHTWARD ADJOINING OBJECT | DOWNWARD ADJOINING OBJECT |
|---|---|---|---|
| N1 | O2 | O3 | — |
| N2 | O3 | — | O4 |

24

| CLUSTER ID | COORDINATES OF THE CENTER OF GRAVITY | OBJECT LIST |
|---|---|---|
| CL1 | (633, 616) | (O2, O3, O4) |
| CL2 | (3000, 300) | (O1) |

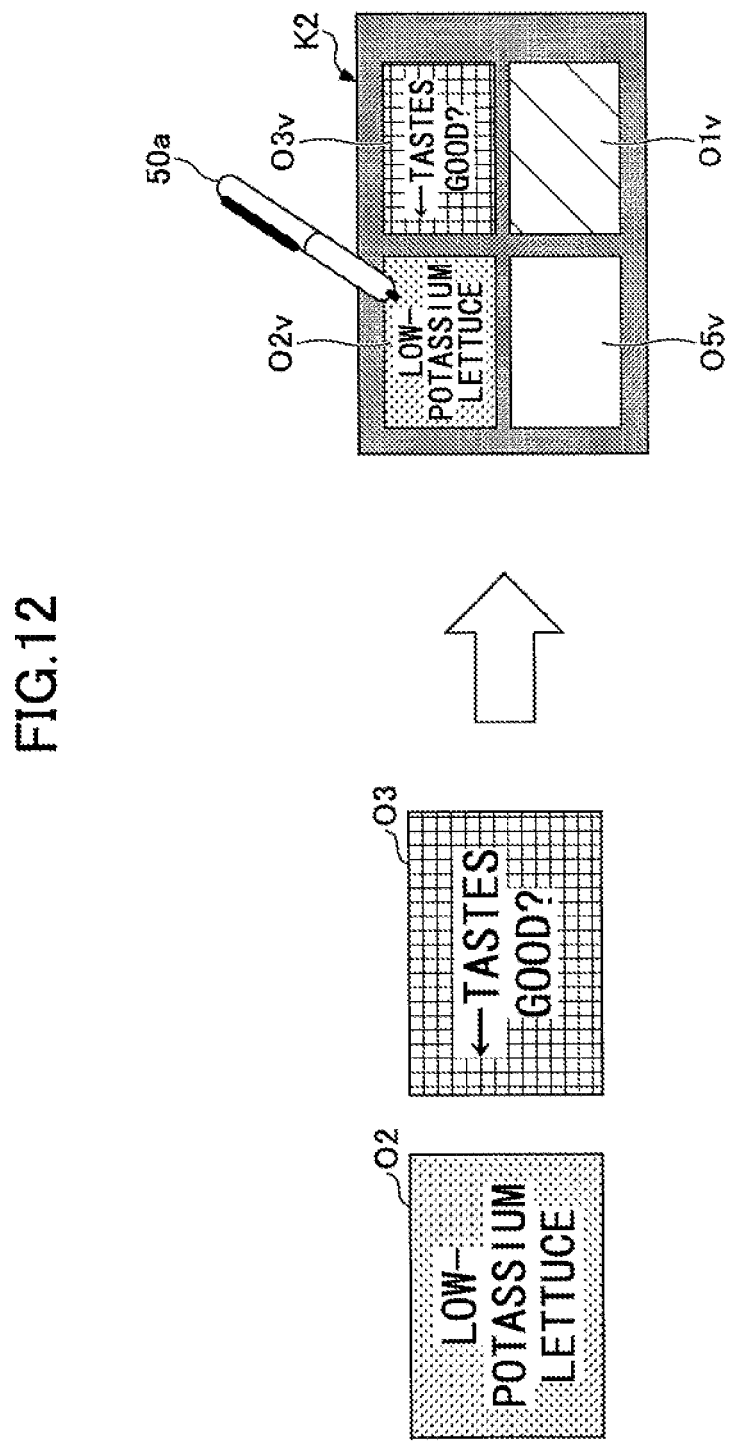

DISPLAY CONTROL PROGRAM, DISPLAY CONTROL METHOD, AND DISPLAY CONTROL APPARATUS

CROSS-REFERENCE TO RELATED APPLICATIONS

This application is based upon and claims the benefit of priority of the prior Japanese Priority Application No. 2017-105567 filed on May 29, 2017, the entire contents of which are hereby incorporated by reference.

FIELD

The present disclosure relates to a display control program, a display control method, and a display control apparatus.

BACKGROUND

In recent years, human-computer interaction systems that are constituted with electronic pens, various sensors, projectors, and the like, or what is called "interactive white boards" have been proposed (see, e.g., Patent document 1).

In an interactive white board using an electronic pen, a movement trajectory of the electronic pen on a board plane is detected by a sensor, and drawn figures and characters are displayed on the board plane. Also, a command to a computer is recognized from lines of movement of the electronic pen on the board plane, by which an operation of the computer is controlled.

RELATED-ART DOCUMENTS

Patent Documents

[Patent Document 1] Japanese laid-Open Patent Publication No. 2016-194894
[Patent Document 2] Japanese Laid-Open Patent Publication No. 2010-122987
[Patent Document 3] Japanese Laid-Open Patent Publication No. 2013-54405
[Patent Document 4] Japanese Laid-Open Patent Publication No. 2007-233511

SUMMARY

According to an embodiment, a display control method executed by a computer includes selecting an object from among a plurality of objects displayed in a display area in response to detecting a specific operation, obtaining first identification information corresponding to the selected object, and positional relationship information that represents a positional relationship between the objects by referring to a storage that stores information regarding the objects, displaying the obtained first identification information in the display area, identifying another object from among the objects in response to receiving a designation of a direction, based on the selected object, the obtained positional relationship information, and the designated direction, obtaining second identification information corresponding to the identified another object, and displaying the obtained second identification information in the display area.

The object and advantages in the embodiment will be realized and attained by means of the elements and combinations particularly pointed out in the claims. It is to be understood that both the foregoing general description and the following detailed description are exemplary and explanatory and are not restrictive of the invention as claimed.

BRIEF DESCRIPTION OF DRAWINGS

FIG. 3 is a diagram illustrating an example of a specific operation registration table according to an embodiment;

FIG. 4 is a diagram illustrating an example of an object information table according to an embodiment;

FIG. 5 is a diagram illustrating an example of a thumbnail display order table according to an embodiment;

FIG. 6 is a diagram illustrating an example of an adjoining object table according to an embodiment;

FIG. 12 is a diagram for illustrating display of adjoining objects by the thumbnails according to an embodiment;

DESCRIPTION OF EMBODIMENTS

In the following, embodiments will be described with reference to the drawings. Note that the same reference codes are assigned to substantially the same elements throughout the specification and the drawings, and duplicated description will be omitted.

In a conventional interactive white board, multiple users share objects such as multiple tags and images displayed on a desk or a wall surface. Therefore, objects may be placed one after another on the interactive white board on the desk or the wall surface, and may amount to a considerable number. In such a case, many objects may overlap, a target object may be hidden under the other objects, and hence, it may become difficult to locate the target object among the objects being displayed on the desk or the like, which worsens the operational efficiency.

On the other hand, if displaying multiple objects broadly on the interactive white board without overlap, the workspace for the other users may run short. Then, in order to secure the workspace for the users, if the interactive white board is set to cover a broader area, when selecting a specific object, it may become unreachable from a certain user.

According to an aspect in the present disclosure, it is possible to locate a target object easily.

[Overall Configuration of Display Control System]

Figure 1:
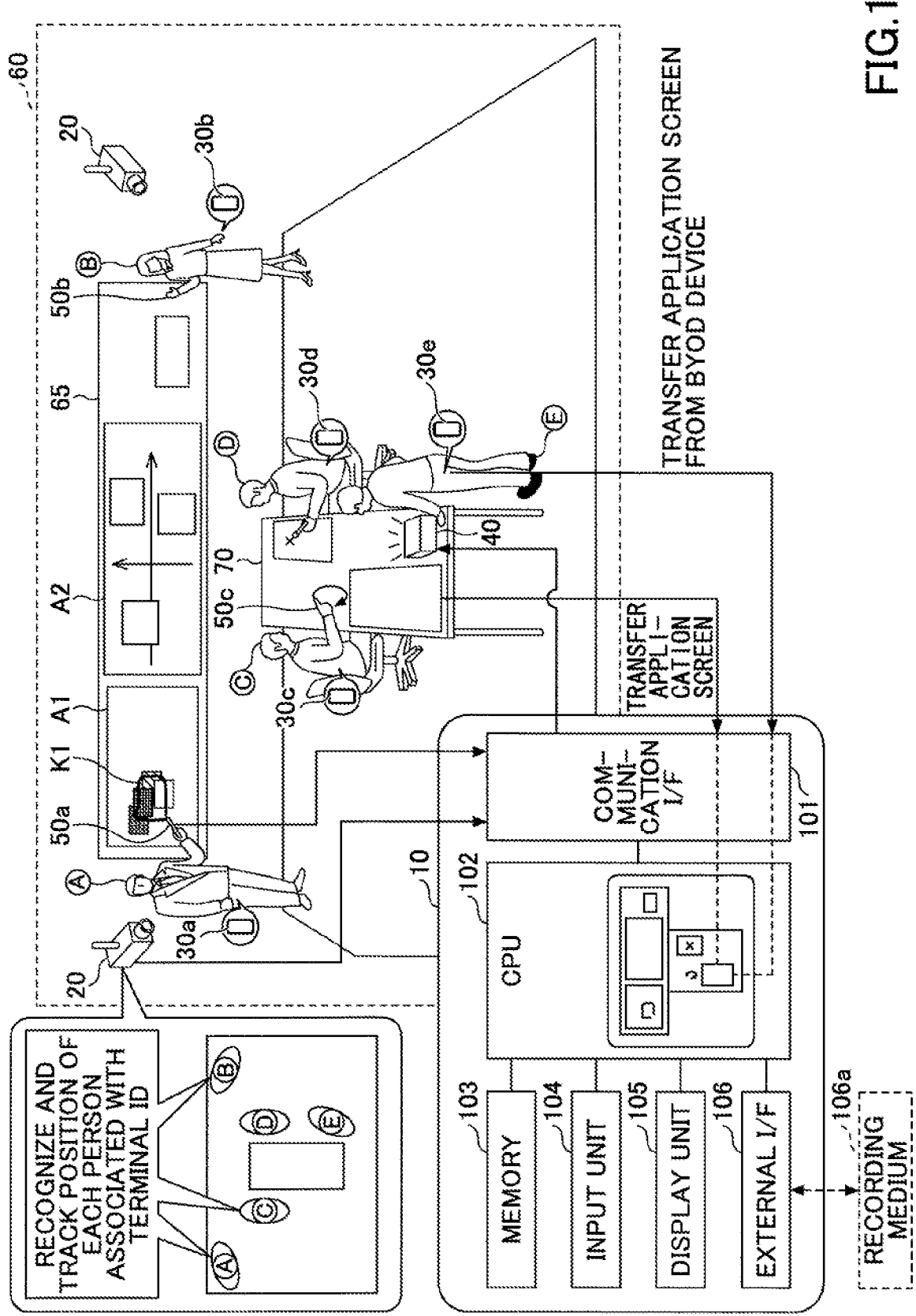
FIG. 1 is a diagram illustrating an example of an overall configuration of a display control system according to an embodiment.

First, an example of a configuration of a display control system according to an embodiment in the present disclosure will be described with reference to FIG. 1. FIG. 1 is a diagram illustrating an example of an overall configuration of a display control system according to an embodiment. In the display control system according to the embodiment, a wall 65 and a desk 70 in a conference room 60 are illustrated as screens on which objects are displayed, namely, as an example of an interactive white board.

However, the entire conference room 60 including the ceiling, the floor, and the like of the conference room 60 may serve as an interactive white board. Also, an area on which objects are displayed by the display control system is not limited in the conference room 60, and may be in all places and things including wall surfaces of buildings such as schools, companies, and hospitals, wall surfaces of streets and stations, and furniture.

In the conference room 60, multiple devices that combine a projector 40 and a camera 20 are installed so as to make the entire space of the conference room 60 function as one window system. This makes it possible for multiple users A to E to share object information of images, tags, and the like displayed on the interactive white board. The camera 20 is an example of a sensor that is capable of recognizing infrared rays output from a pen device.

For example, if the user A performs an operation of inputting a predetermined trajectory in a display area on the interactive white board (referred to as the "board", below) by using a pen device 50*a*, the camera 20 installed on the ceiling detects a movement trajectory K1 of infrared rays output from the pen device 50*a*. The display control apparatus 10 analyzes an image captured by the camera 20, extracts the movement trajectory K1 of infrared rays output from the pen device 50*a*, and generates coordinate information of a trajectory to be displayed on the display area of the board by using the projector 40. The generated coordinate information is transmitted to the projector 40. Thus, the infrared movement trajectory K1 is projected on a display area A1 in the board plane by using the projector 40. The display areas A1 and A2 in the board that use a desk, a wall, and the like are collectively referred to as the display area. In FIG. 1, multiple display areas A1, A2 and so on are provided in the board. However, the display area does not need to be divided into multiple display areas as long as it is a projectable area in the board.

A specific operation to be detected by the camera 20 is not limited to an input operation performed with the pen devices 50*a* to 50*d*, and may be, for example, an input operation performed with a gesture 50*b* of the user B or a finger 50*c* of the user C. The camera 20 transmits captured images of these input operations to the display control apparatus 10. The display control apparatus 10 analyzes the images received from the camera 20, and executes processing according to the respective operations. Specific operations to be detected include voice operations and the like other than those performed with a pen, a finger, and a gesture. In order to detect voice, a sound input device such as a microphone may be used instead of the camera 20. Also, information projected by the projector 40 includes images of applications, photographs, electronic tags, text, and the like.

The camera 20 and the display control apparatus 10, and the projector 40 and the display control apparatus 10 are connected by radio or by cable, to be capable of data communication. These devices may be connected directly or may be connected through a network. For example, a projector and a display control apparatus may foe provided in a remote place away front the conference room 60 for sharing a conference, to display objects on a board in a predetermined space by interacting with these devices.

The display control apparatus 10 may be an information processing apparatus such as a server, a personal computer, a tablet terminal, a smart phone, or a PDA (Personal Digital Assistant). The display control apparatus 10 is capable of data communication with the camera 20, the projector 40, and multiple terminals 30*a* to 30*e* of the users A to E that exist in the conference room 60, through a communication interface (I/F) 101.

The display control apparatus 10 includes a CPU 102, a memory 103, an input, unit 104, a display unit 105, and an external I/F 106 in addition to the communication I/F 101.

The memory 103 stores a program for controlling the entire display control apparatus 10, a program that implements functions installed in the display control apparatus 10, and various data items. The memory 103 is implemented by, for example, a ROM (Read-only Memory), a RAM (Random Access Memory), and an HDD (Hard Disk Drive). A ROM is a non-volatile semiconductor memory that holds internal data even when the power is turned off. A RAM is a volatile semiconductor memory that stores programs and data temporarily. An HDD is a non-volatile storage device that stores programs and data.

The CPU 102 controls the entire display control apparatus 10. Also, the CPU 102 obtains an image from the camera 20, and based on the image, analyzes an input trajectory operated by a user. The CPU 102 refers to a table stored in the memory 103 in which specific operations are associated with respective commands (a specific operation registration table 21 in FIG. 2), to identify a command to be executed with a specific operation corresponding to an input trajectory.

Also, the CPU 102 reads out a display control program or a predetermined data item stored in the HDD or the ROM, into the RAM, to execute a process following an identified command. In the case where the process following an identified command is a thumbnail display process, arrangement information that represents a display position of an identification information item of a specific object is transmitted to the projector 40 through the communication I/F 101. Following the transmitted identification information items of specific objects, the projector 40 displays the identification information items of the multiple objects on a thumbnail display area designated by the user in the display area of the board.

Note that the CPU 102 may associate the terminals ID of the terminals 30*a* to 30*e* held by the users A to E with respective positions of the users, to recognize the positions so as to track operations of the users A to E, respectively. Also, the CPU 102 may receive screens of predetermined applications and other information items from the respective terminals 30*a* to 30*e*. Depending on the positions of the users associated with the terminal IDs, the CPU 102 can display the screens of predetermined applications and the other information, items at predetermined positions on the board. Note that the terminals 30*a* to 30*e* are examples of so-called "BYOD" devices, although not indispensable in the system.

The input unit 104 includes a keyboard, a mouse, and the like, to be used for inputting operational signals into the display control apparatus 10. The display unit 105 may be a display such as an LCD (Liquid Crystal Display) monitor or a CRT (Cathode Ray Tube), to output various processed results.

The external I/F 106 is an interface with an external device. The external devices include a recording medium 106a and the like. This enables the display control apparatus 10 to read and/or write on the recording medium 106a through the external I/F 106. The recording medium 106a may be a CD (Compact Disk), a DVD (Digital Versatile Disk), an SD memory card, a USB (Universal Serial Bus) memory, or the like.

[Functional Configuration]

Figure 2:
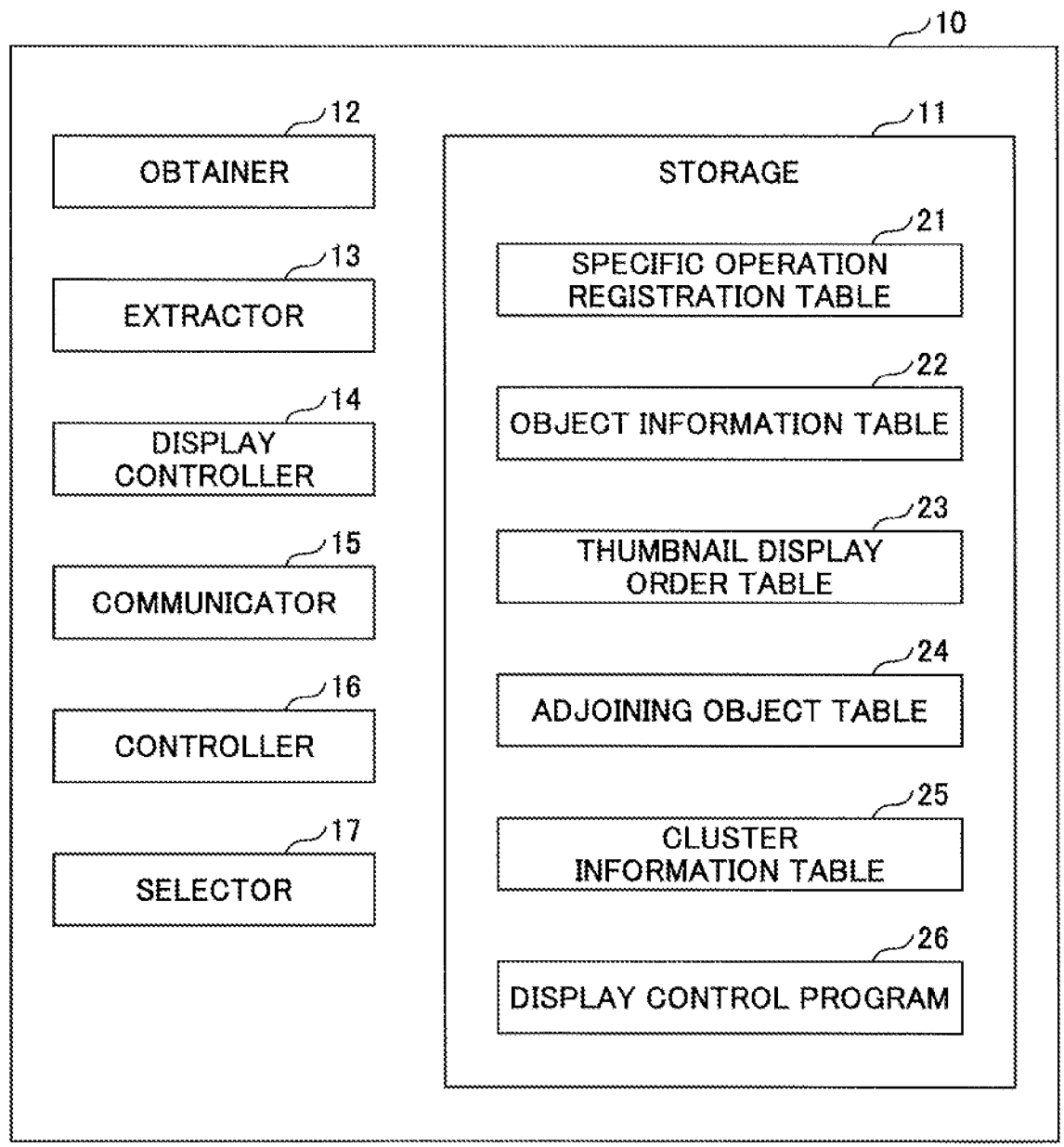
FIG. 2 is a diagram illustrating an example of a functional configuration of a display control apparatus according to an embodiment.

Next, an example of a functional configuration of the display control apparatus 10 according to the first embodiment will be described with reference to FIG. 2. FIG. 2 is a diagram illustrating an example of a functional configuration of the display control apparatus 10 according to an embodiment. The display control apparatus 10 includes a storage 11, an obtainer 12, an extractor 13, a display controller 14, a communicator 15, a controller 16, and a selector 17.

The storage 11 stores tables of a specific operation registration table 21, an object information table 22, a thumbnail display order table 23, an adjoining object table 24, and a cluster information table 25. The storage 11 also stores a display control program 26.

FIG. 3 illustrates an example of the specific operation registration table 21 according to an embodiment. In the specific operation registration table 21, each operation ID that identifies an input operation is associated with information items of a trajectory and a specific operation, and is registered. For example, if a trajectory of infrared rays output by the pen device 50a has a shape of "trajectory 1", the operation identified by the input operation is "display by the thumbnail". Therefore, if a user draws "trajectory 1" by using a pen device, an image of drawing the trajectory 1 captured by the camera is transmitted to the display control apparatus 10. The display control apparatus 10 analyzes the obtained image, compares an analysis result with the items in the specific operation registration table 21, and selects a specific operation "display by the thumbnail" that corresponds to the trajectory 1. The selected specific operation "display by the thumbnail" is transmitted to the projector 40. In this way, the identification information items of multiple specific objects are displayed by the projector 40.

FIG. 4 is a diagram illustrating an example of the object information table 22 according to an embodiment. In the object information table 22, each object ID is associated with the name of the object, information, of a layer in which the object exists, information items of coordinates, width, type, content, owner, associated screen, and site of the object to be displayed, and is stored. The associated screen is information that specifies the display area A1, A2, or the like on the board.

FIG. 5 is a diagram illustrating an example of the thumbnail display order table 23 according to an embodiment. In the thumbnail display order table 23, each thumbnail ID is associated with information items of an object ID and an image of the thumbnail, and is stored.

FIG. 6 is a diagram illustrating an example of the adjoining object table 24 according to an embodiment. In the adjoining object table 24, each adjoining object ID is associated with information items of a reference object and a rightward adjoining object or a downward adjoining object with respect to the reference object, and is stored.

Figure 7:
FIG. 7 is a diagram illustrating an example of a cluster information table according to an embodiment.

FIG. 7 is a diagram illustrating an example of the cluster information table 25 according to an embodiment. In the cluster information table 25, each cluster ID is associated with information items of coordinates of the center of gravity of the cluster, and an object list, and is stored.

The display control program 26 causes the CPU 102, when detecting a specific operation, to execute a process for displaying multiple objects that satisfy a condition among multiple objects displayed on a predetermined display area of the conference room 60, at positions having a predetermined positional relationship according to a designated display position.

The obtainer 12 obtains an image captured by the camera 20. The extractor 13 analyses the obtained image, extracts a trajectory or a gesture in the captured infrared rays, and refers to the specific operation registration table 21 to identify an operation corresponding to the trajectory or the gesture. If detecting that the identified operation is an operation of "display by the thumbnail", the extractor 13 identifies multiple objects that satisfy a condition among multiple objects displayed on the display area.

The obtainer 12 refers to the object information table 22, to obtain identification information items of the multiple identified objects, and coordinates that represent a positional relationship between the multiple identified objects. The embodiment will be described with an example in which respective thumbnail images corresponding to multiple identified objects are considered identification information items of the multiple identified objects. However, the identification information of an identified object is not limited as such, and other examples may include the name of the identified object; the content of the object; the type, site, or owner of the object; and any combination of these information items. The identification information of an object may be an image of the object itself, may be a reduced image of the object, and may be a part, of the image of the object. Also, the identification information of the object may be a tag, may be text written on a tag, and may be a part of text (e.g., a leading string) written on a tag. The identification information of an object may be a path of a storage place where a file is stored.

Coordinates that represent a positional relationship between multiple identified objects correspond to an example of positional relationship information that represents a positional relationship between the multiple identified objects, which can be calculated from coordinates in the object information table 22 in FIG. 4.

The display controller 14 displays the thumbnail images of multiple identified objects on a display area such that a positional relationship is met according to the obtained coordinates that represents the positional relationship between the multiple identified objects.

The communicator 15 performs data communication with the camera 20, the terminals 30a to 30e, the projector 40, and the other devices.

The controller 16 controls the entire display control apparatus 10. The selector 17 selects one of the thumbnail images in response to detecting a touch or a specific operation. This makes it possible to browse or edit a thumbnail image selected from among the thumbnails being displayed.

Note that each of the displayed thumbnail images serves an operational part to be operated for moving or editing the object corresponding to the thumbnail image. If one of the images displayed by the thumbnail (a thumbnail image) is selected by a user, transition occurs to an edit mode. In the edit mode, a simplified thumbnail image is transformed into a real image of the object; a partial image is transformed into a full-size image; or a reduced image is transformed into an enlarged image, and the transformed image is displayed. The image displayed as such may return to the state of thumbnail displaying after editing has been completed.

For example, in the case where an operational part is a tag object, when transition occurs to the edit mode, the selected tag object may be expanded to be displayed in a state in which editing is enabled.

Note that the block diagram illustrated in FIG. 2 focuses on functions, and a processor that executes software corresponding to the parts designated by these functional blocks is hardware.

The functions of the storage 11 may be implemented, for example, by the memory 103. The functions of the obtainer 12 may be implemented, for example, by the input unit 104. The functions of the extractor 13, the display controller 14, the controller 16, and the selector 17 may be implemented, for example, by processes which the display control program 26 installed in the display control apparatus 10 causes the GPU 102 to execute.

The functions of the communicator 15 may be implemented, for example, by the communication I/F 101. Information stored in the tables of the specific operation registration table 21, the object information table 22, the thumbnail display order table 23, the adjoining object table 24, and the cluster information table 25 may be stored in the memory 103 or a server and the like on the cloud connected to the display control apparatus 10 through a network.

[Display Control Process]

Figure 8:
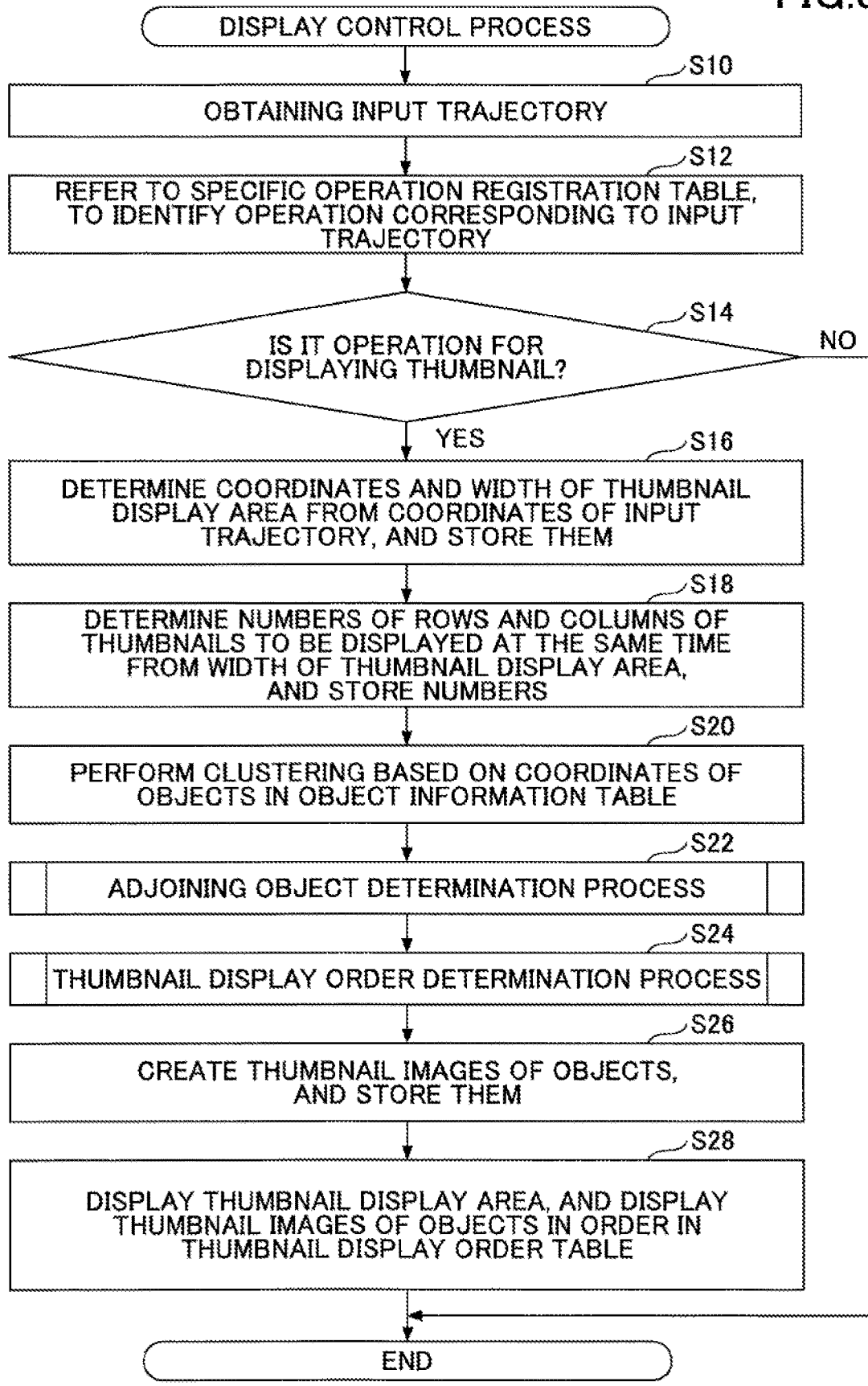
FIG. 8 is a flowchart illustrating an example of a display control process according to an embodiment.
Figure 9:
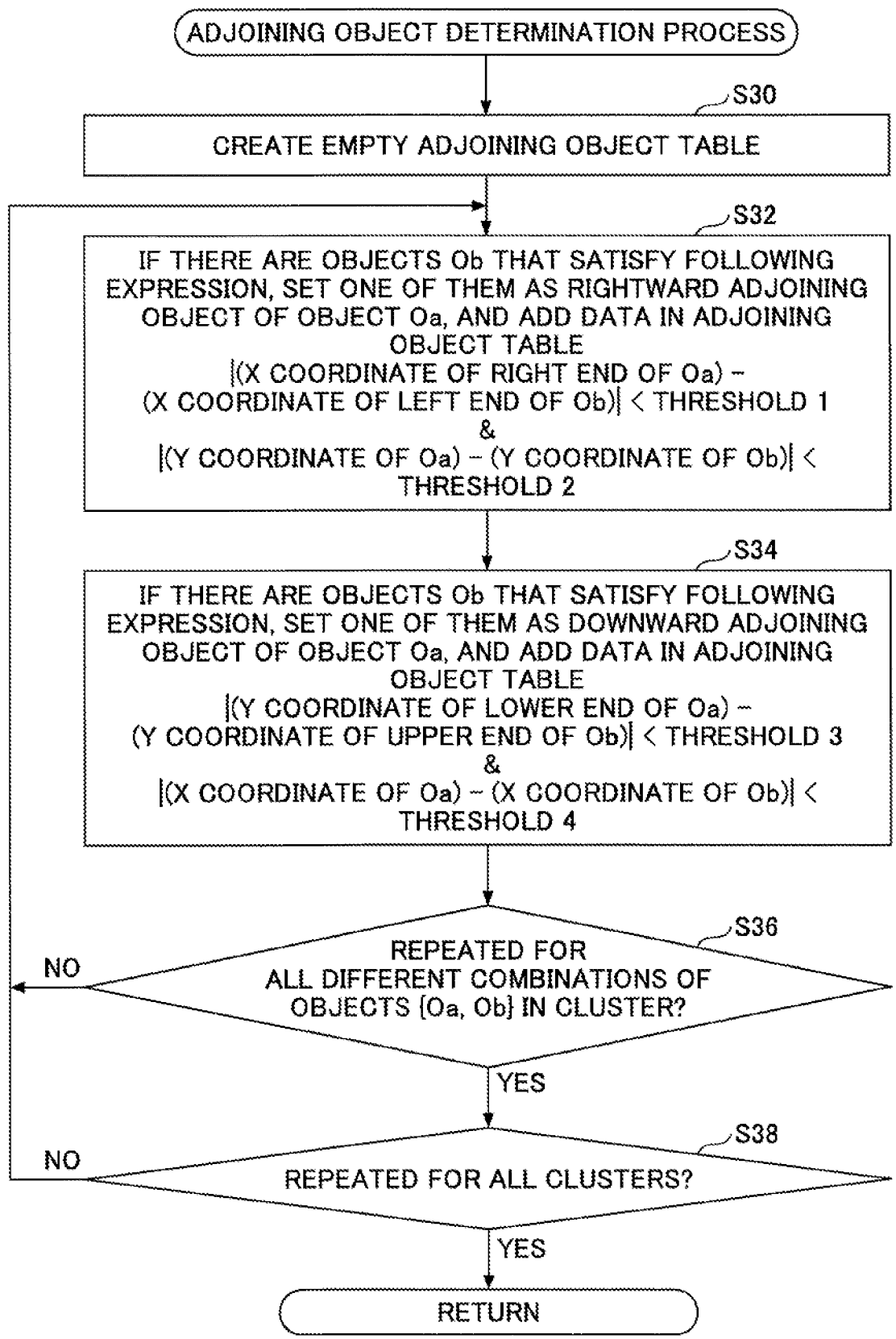
FIG. 9 is a flowchart illustrating an example of an adjoining object determination process according to an embodiment.
Figure 10:
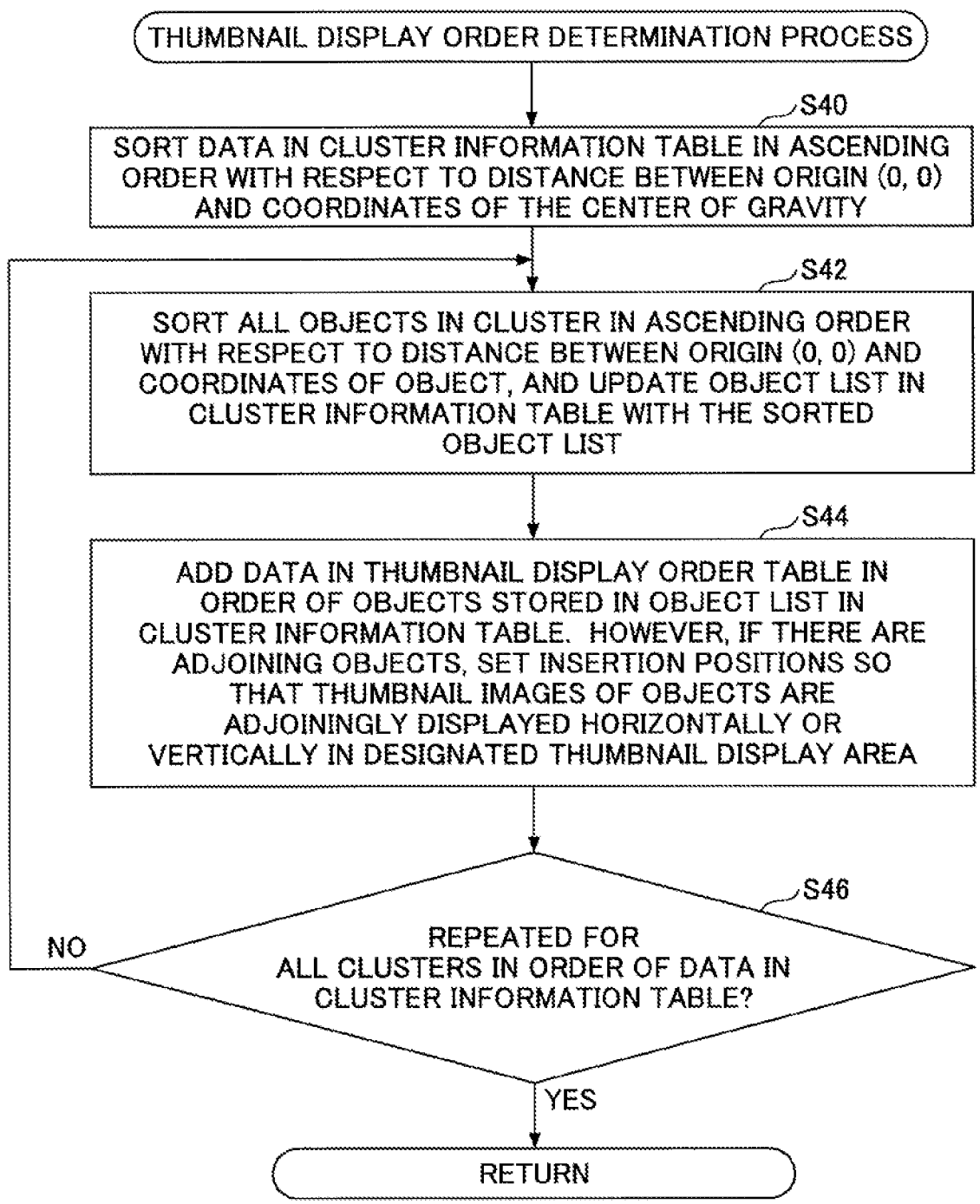
FIG. 10 is a flowchart illustrating an example of a thumbnail display order determination process according to an embodiment.
Figure 11A:
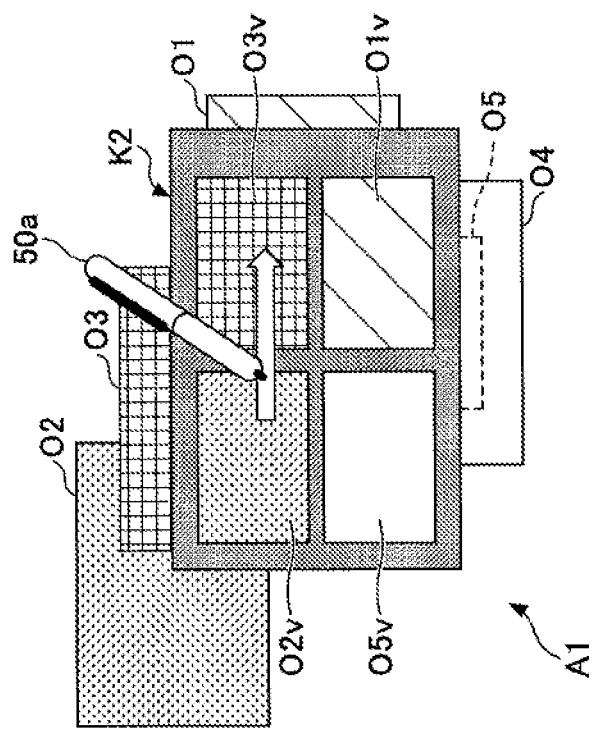
FIGS. 11A and 11B are diagrams for illustrating a display control process according to an embodiment.
Figure 11B:
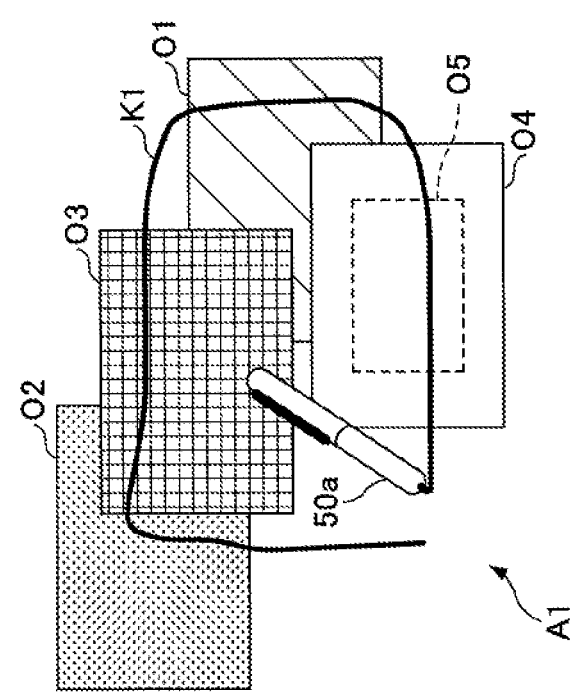

Next, an example of a display control process according to the embodiment will be described with reference to FIG. 8. FIG. 8 is a flowchart illustrating an example of a display control process according to an embodiment. FIG. 9 is a flowchart illustrating an example of an adjoining object determination process according to an embodiment. FIG. 10 is a flowchart illustrating an example of a thumbnail display order determination process according to an embodiment. FIGS. 11A and 11B are diagrams for illustrating a display control process according to an embodiment.

Once the display control process in FIG. 8 has been started, the obtainer 12 obtains image data captured by the camera 20, and analyses the image to obtain an input trajectory (Step S10). Next, the extractor 13 refers to the specific operation registration table 21, to identify an operation corresponding to the obtained input trajectory (Step S12). For example, as illustrated in FIG. 11A, if an input trajectory K1 surrounding an area on a desk formed, by a pen device coincides with the trajectory 1 as in the example of the specific operation registration table 21 in FIG. 3, the extractor 13 identifies the input operation as a specific operation of "display by the thumbnail".

Next, the extractor 13 determines whether it is an operation of display by the thumbnail (Step S14). If having determined that it is not an operation of display by the thumbnail, the extractor 13 ends the process. On the other hand, if having determined that it is an operation of display by the thumbnail, the extractor 13 determines the coordinates and width of the thumbnail display area from coordinates of the input trajectory, and stores them in the storage 11 (Step S16).

Next, from the width of the thumbnail display area, the extractor 13 determines the number of rows and the number of columns of thumbnails that are displayed at the same time, and stores the numbers in the storage 11 (Step S18). Next, the extractor 13 performs clustering based on the coordinates of the objects in the object information table 22, and creates the cluster information table 25 (Step S20). By this step, the objects are classified into several clusters depending on the positional information of the objects. Next, an adjoining object determination process is executed as will be described below (Step S22).

[Adjoining Object Determination Process]

In the adjoining object determination process in FIG. 9, first, the display controller 14 creates an empty adjoining object table 24 (step S30). Next, the display controller 14 adds data of one of objects Ob that satisfy the following expression (1) if there are any, as an object that adjoins an object Oa on the right-hand side (also referred to as a "rightward adjoining object") (Step S32).

$$|(X \text{ coordinate of right end of } Oa)-(X \text{ coordinate of left end of } Ob)|<\text{threshold 1, and}$$

$$|(Y \text{ coordinate of } Oa)-(Y \text{ coordinate of } Ob|<\text{threshold 2} \quad (1)$$

Note that the threshold 1 and the threshold 2 are defined in advance, and are stored in the storage 11.

By executing Step S32, information items of a reference object and a rightward adjoining object are stored in the adjoining object table 24 in FIG. 6, associated with the adjoining object ID.

Referring back to FIG. 9, next, the display controller 14 adds data of one of objects Ob that satisfy the following expression (2) if there are any, as an object that adjoins an object Oa on the lower side (also referred to as a "downward adjoining object") (Step S34).

$$|(Y \text{ coordinate of lower end of } Oa)-(Y \text{ coordinate of upper end of } Ob)|<\text{threshold 3, and}$$

$$|(X \text{ coordinate of } Oa)-(X \text{ coordinate of } Ob)|<\text{threshold 4} \quad (2)$$

Note that the threshold 3 and the threshold 4 are defined in advance, and are stored in the storage 11.

By executing Step S34, information items of a reference object and a downward adjoining object are stored in the adjoining object table 24 in FIG. 6, associated with the adjoining object ID.

Referring back to FIG. 9, next, the display controller 14 determines whether Steps S32 and S34 have been executed repeatedly for all different combinations, of the objects {Oa, Ob} in a cluster stored in the cluster information table 25 (Step S36). If having determined that Steps S32 and S34 have not been executed for all different combinations of the objects {Oa, Ob} in the cluster, the display controller 14 returns to Step S32, and executes Steps S32 and S34 for non-executed combinations of the objects {Oa, Ob}.

On the other hand, if having determined at Step S36 that Steps S32 and S33 have been executed for all different combinations of the objects {Oa, Ob} in the cluster, the display controller 14 determines whether Steps S32 and S34 have been executed repeatedly for all clusters (Step S38). If having determined that Steps S32 and S34 have not been executed for all clusters, the display controller 14 executes Steps S32 and S34 for combinations of the objects {Oa, Ob} for non-executed clusters. If having determined that Steps S32 and S34 have been executed for all the clusters, the display controller 14 ends the process.

When the process in FIG. 9 is completed and returns to FIG. 8, next, a determination process of thumbnail display order is executed (Step S24).

[Determination Process of Thumbnail Display Order]

In the determination process of thumbnail display order in FIG. 10, first, the display controller 14 sorts data, in the cluster information table 25 in ascending order with, respect to the distance between the origin (0, 0) and coordinates of the center of gravity (Step 340).

Next, the display controller 14 sorts all the objects in each cluster in ascending order with respect to the distance between the origin (0, 0) and the coordinates of the object, and updates an object list in the cluster information tables 25 with the sorted object list (Step S42).

Next, the display controller 14 adds data in the thumbnail display order table 23 in order of the objects stored in the object list in the cluster information table 25 (Step 344). However, the display controller 14 may refer to the adjoining object table 24, and if there is an adjoining object, sets an insertion position so that thumbnail images of the objects are adjoiningly displayed horizontally or vertically in a designated thumbnail display area (Step 344).

Next, the display controller 14 determines whether Steps S42 and S44 have been executed repeatedly for all clusters in the order of data in the cluster information table 25 (Step S46). If having determined that Steps S42 and S44 have not been executed for all clusters, the display controller 14 executes Steps S42 and S44 repeatedly until Steps S42 and S44 are executed clusters for all the clusters.

On the other hand, if having determined at Step S46 that Steps S42 and S44 have been executed for all the clusters, the display controller 14 ends the process.

Having completed the process in FIG. 10, and returning to FIG. 8, next, the display controller 14 creates thumbnail images of respective objects, and stores them in the thumbnail display order table 23 (Step S26). Next, the display controller 14 displays a designated thumbnail display area, displays the thumbnail images of the objects in the order in the thumbnail display order table 23 (Step S28), and ends the process.

Consequently, for example, as illustrated in FIGS. 11A and 11B, when a user performs an input operation with the pen device 50a, a thumbnail display area K2 is set in accordance with the input trajectory K1, and thumbnail images of multiple objects are displayed in the thumbnail display area K2 at specific positions in ascending order. In FIG. 11B, a thumbnail image O2v of an object O2, a thumbnail image O3v of an object O3, a thumbnail image O5v of an object O5, and a thumbnail image O1v of an object O1 are displayed in ascending order in the designated thumbnail display area K2.

For example, when projecting applications, photographs, electronic tags, and the like on a screen by the projector 40, if target objects increase, many objects may overlap, and hence, it becomes especially difficult to see lower objects, and operations on such objects become difficult. For example, the object O5 illustrated in FIG. 11A is displayed under the object O4, and is not visible.

In contrast, according to the embodiment, as illustrated in FIG. 11A, when a user surrounds an area on the desk with a pen, the movement trajectory K1 of infrared rays caused by the pen device 50a is detected, which defines the thumbnail display area K2 as illustrated in FIG. 11B where the thumbnail images are to be displayed.

Then, in the defined thumbnail display area K2 illustrated in FIG. 11B, thumbnail images of one or more designated objects are displayed (display by the thumbnail). This enables to easily locate a target object from among a large number of objects overlapping each other.

In the example illustrated in FIG. 11B, while keeping the multiple objects O1 to O5 being displayed in the display area on the board, the multiple thumbnail images O1v to O3v, and O5v corresponding to the multiple objects O1 to O3, and O5 are displayed in the thumbnail display area K2, which is an example of obtained identification information items. Each of the multiple objects O1 to O3, and O5 displayed by the thumbnail is an example of an operational part to be operated for moving or editing the object corresponding to the identification information. This enables to easily locate a target object from among a large number of objects overlapping each other, and to edit the located object.

Also, a thumbnail display area is defined by a user. Therefore, the user can define an area as a thumbnail display area such that a pen operation or the like of the user does not interfere with operations of the other users. Also, since such a thumbnail display area is defined within the reach of the user, when the user edits an object displayed by the thumbnail, the user can reach the object naturally, and thereby, it is possible for the user to work further efficiently.

An object to be displayed by the thumbnail in a thumbnail display area is identified by the extractor 13. As an identifying method, for example, the extractor 13 uses layer information in the object information table 22 in FIG. 4, and displays objects starting from the lowermost layer. This method enables, as illustrated in the example in FIG. 11B, to prioritize a thumbnail image of an object on a lower side of overlapping layers when displaying objects by the thumbnails, and hence, it is possible to easily locate a target object from among a large number of objects overlapping each other, and to make operations easier.

Other than the method that uses the layer information, another method may be considered, for example, that displays objects starting from the oldest one in terms of the display time. This method also enables to display overlapping objects in order from the lower side (from the older side), and to easily locate a target object.

As other methods, displaying by the thumbnail may be prioritized for an object being displayed in an area surrounded by the pen device 50a, or objects may be displayed randomly. Note that the number of objects to be displayed by the thumbnail at the same time may be set greater if the thumbnail display area is larger, or may be set greater if the total number of objects is greater.

In the embodiment, if a specific operation (e.g., a swipe operation illustrated in FIG. 11B) is detected, the selector 17 selects one of the objects displayed in the thumbnail display area.

Then, the obtainer 12 refers to the object information table 22, to obtain first identification information (a thumbnail image or the like) corresponding to the selected object, and positional relationship information that represents a positional relationship among multiple objects.

Next, the display controller 14 displays the first obtained identification information in the thumbnail display area. Also, in response to receiving a designation of a direction by a specific operation, the extractor 13 identifies another object from among the multiple objects, based on the selected object, the obtained positional relationship information, and the designated direction. The obtainer 12 obtains second identification information corresponding to the other identified object (a thumbnail image or the like). The display controller 14 displays the second obtained identification information in the display area. Note that among the multiple objects, an object positioned in the designated direction with respect to the selected object may be set as the other object.

This makes it possible to switch the identification information of the specific object displayed by the thumbnail, as illustrated in FIG. 11B, to the identification information of the other object positioned in the direction in which the swiping operation has been performed, in response to the swipe operation performed with the pen device 50a or a finger in the thumbnail display area K2.

In the display control process according to the embodiment, as noted by "HOWEVER" in Step S44 in FIG. 10, if an adjoining object is identified with reference to the adjoining object table 24, display positions of identification information items of respective object are set so that adjoining objects are adjoiningly displayed horizontally or vertically also in the thumbnail display area.

In this way, it is favorable to devise arrangement of the identification information items of the objects in a thumbnail display area so that adjoining objects are displayed next to each other. This enables to locate a target object more efficiently. For example, among a large number objects being displayed on the board, objects having a closer display distance may be considered to have a higher relevance. Therefore, the display controller 14 stores objects having a closer display distance in the adjoining object table 24. Then, when displaying by the thumbnails such objects stored in the adjoining object table 24, the display controller 14 displays the objects adjoining horizontally or vertically, on the same page or close pages. At this time, horizontal or vertical arrangement of the adjoining objects is also controlled.

For example, in response to a designation of a detection position (e.g., a touch position) of a specific operation on the thumbnail display area K2, the first identification information may be displayed at a position according to the designated position. In the example of the adjoining object table 24 in FIG. 6, as illustrated in FIG. 12, the thumbnail, image O3v of the rightward adjoining object O3 is displayed on the right-hand side of the thumbnail image O2v of the reference object O2. In this way, by displaying the second identification information that identifies the other specific object at a position according to the display position of the first identification information that identifies a specific object, the objects are displayed by the thumbnails in consideration of their relevance. Therefore, the user can locate a target object more easily.

This also enables, after having located a target object, when editing or browsing the object, to easily recognize multiple objects having a high relevance, and hence, to further raise operational efficiency.

Note that the first identification information may be a thumbnail image corresponding to the selected object, and the second identification information may be a thumbnail image corresponding to the identified object. However, the first identification information is not limited to a thumbnail image, and may be information with which the selected object can be distinguished such as text corresponding to the selected object and the like. The second identification information is not limited to a thumbnail image, and may be information with which the specified object can be distinguished such as test corresponding to the specified object and the like.

However, the determination process of adjoining objects in FIG. 9 and the process corresponding to the "HOWEVER" note in Step S44 in FIG. 10 may be omitted in the display control process according to the embodiment.

Modified Example

Figure 13:
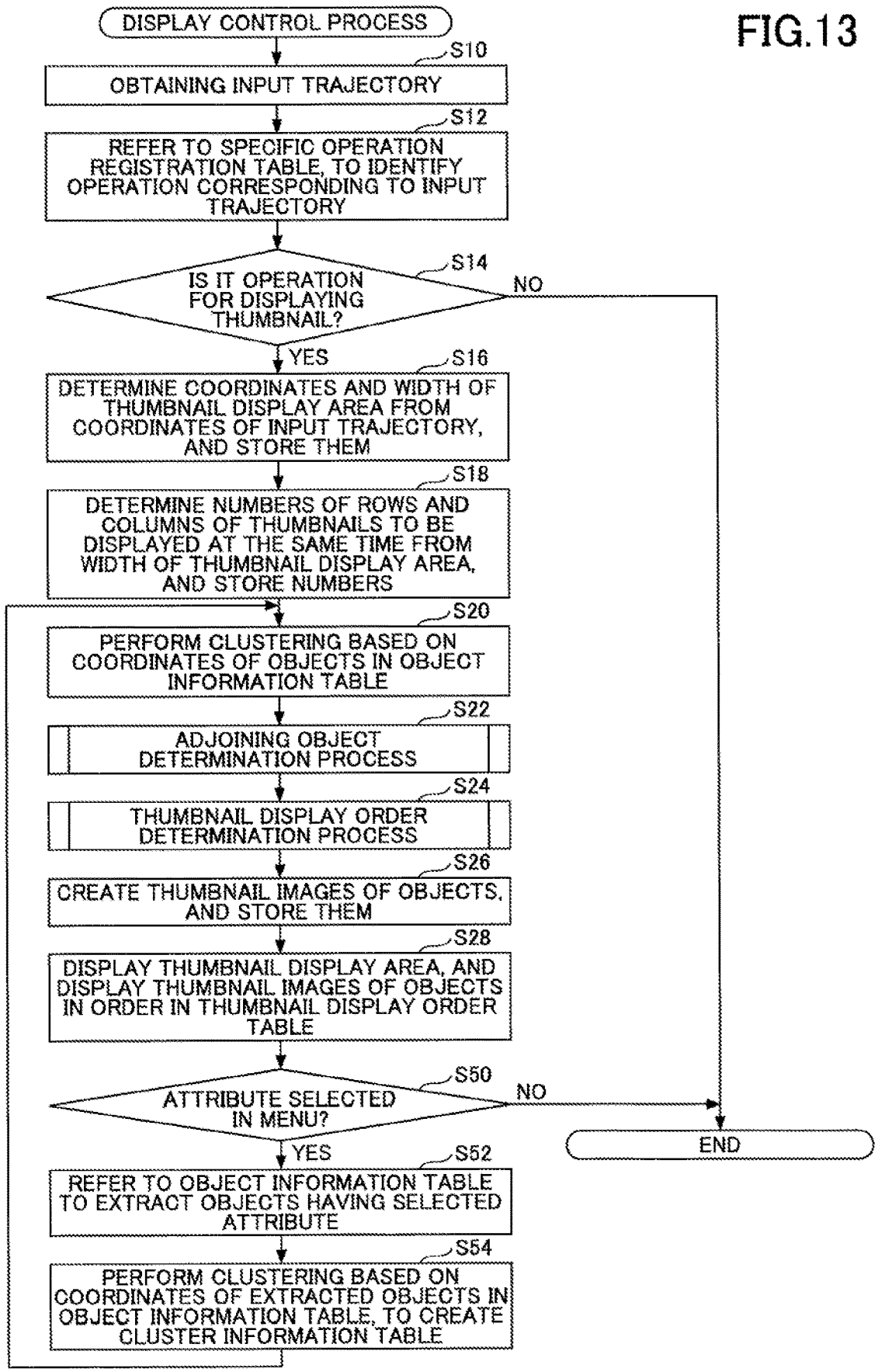
FIG. 13 is a flowchart illustrating an example of a display control process according to a modified example of an embodiment.

Finally, an example of a display control process according to a modified example of an embodiment will be described with reference to FIG. 13. FIG. 13 is a flowchart illustrating an example of a display control process according to a modified example of an embodiment.

Once the display control process according to the modified example in the embodiment has been started, Steps S10 to S28 are executed. Here, since Steps S10 to S28 are the same as Steps S10 to S28 in FIG. 8, the description is omitted.

Figure 14:
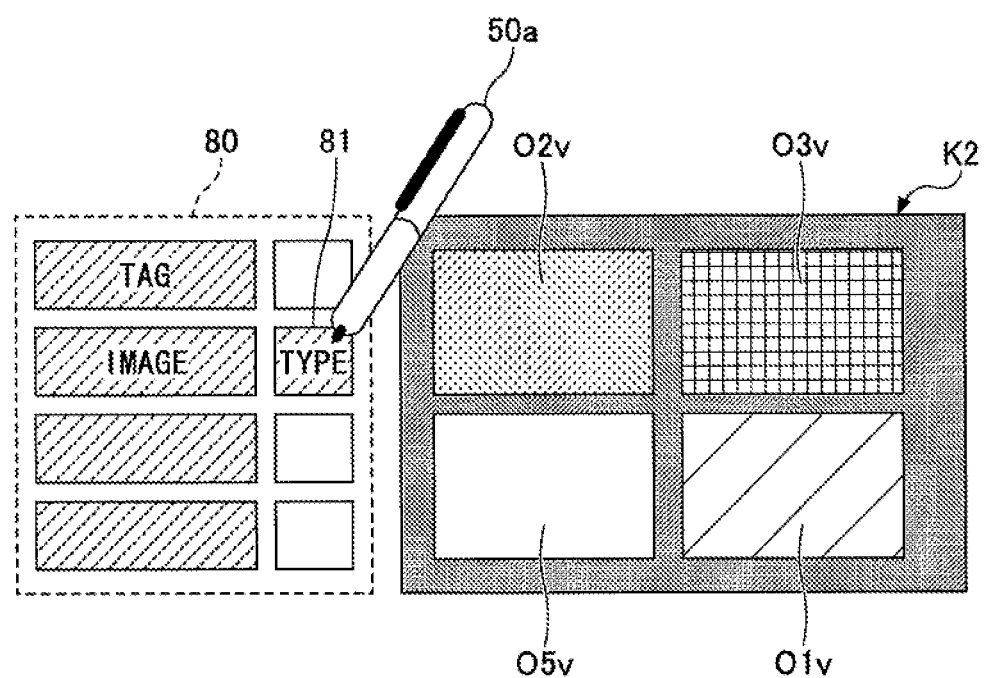
FIG. 14 is a diagram for illustrating a display control process according to a modified example of an embodiment.

Having executed Steps S10 to S28, for example, in a thumbnail display area K2 in FIG. 14, thumbnail images O1v to O3v and O5v of identified objects are displayed by the thumbnails. For example, setting the thumbnail display in the thumbnail display area K2 at this moment, as a default display, the display control process according to the modified example selects an attribute of the object to be displayed from a menu 80 in FIG. 14, extracts a thumbnail image having the selected attribute by filtering, to display the image in the thumbnail display area K2.

Referring back to FIG. 13, a specific flow in the upper process will be described. At Step S50 in FIG. 13, the selector 17 determines whether one of the attributes has been selected in the menu (Step S50). If having determined that no attribute has been selected in the menu, the selector 17 ends the process. In this case, the thumbnail display in the thumbnail display area K2 remains as the default display.

On the other hand, if the selector 17 has determined that one of the attributes has been selected in the menu, the extractor 13 refers to the object information table 22 to extract an object having the selected attribute (Step S52). For example, as illustrated in FIG. 14, in the case where objects of a tag and an image are selected in the menu 80 as the type 81, the extractor 13 extracts objects having the type of tag and image in the object information table 22 illustrated in FIG. 4.

Next, the extractor 13 performs clustering in the object information table 22, based on coordinates of the objects extracted at Step S52, to create the cluster information table 25 (Step S54).

Next, going back to Step S22, Steps S22 to S28 are executed. In this way, in the modified example, only the thumbnail images of extracted objects, namely, objects having the type selected in the menu are displayed by the thumbnails.

Steps S50 to S54 and S22 to S28 are repeated until the selector 17 determines at Step S50 that no attribute in the menu is selected. If it is determined that no attribute in the menu is selected, the process ends.

As described above, according to the display control method according to the modified example of the embodiment, by providing a method of defining an object to be displayed by the thumbnail, and having a user select an attribute of an object to be edited and browsed, it is possible to locate a target object further efficiently.

Note that as the attribute of an object, object owner, object type (tag, image, or the like), desk or wall surface, site (in the case where there is a remote place), and the like may be listed.

As described above, a display control program, a display control method, and a display control apparatus have been described by the above embodiments. Note that the display control program, the display control method, and the display control apparatus according to the present invention are not limited as in the above embodiments, and various modifications and improvements can be made within the scope defined by the subject matters of the claims. Also, in the case where multiple embodiments and modified examples exist, these can be combined as long as no inconsistency arises.

For example, in the above embodiments, as the distance between objects, the display distance is taken as an example to describe the thumbnail display method of identification information items of the objects. However, the distance between objects is not limited to the display distance, and may be a distance between contents. The distance between contents represents relevance between the contents of objects, namely, similarity between the objects. For example, if objects stored in the object information table 22 are classified to have group IDs based on a certain criterion, objects given the same group ID may be determined to have a high relevance of contents, namely, determined to be objects having similar contents. Then, identification information items of the objects whose contents are similar may be closely displayed by the thumbnails. Also, for example, by giving the same group ID to objects of materials 1, 2, and 3 used in a conference room A, it is possible to closely display by the thumbnail, the thumbnail images of these materials having similar contents.

Also, if there is classification information of objects defined by a user (e.g., including type and group ID), the classification information may be used. Based on the classification information including the type of objects and the like, objects having similar contents may be determined. Then, identification information items of the objects having similar contents may be displayed by the thumbnail closely. Instead of classification of objects defined by a user, if there is a learning model that automatically classifies objects according to a predetermined system, the learning model may be used to classify objects. Also in this case, identification information items of the object having similar contents may be displayed by the thumbnail closely, so as to enable to locate a target object further easily.

For example, the configuration of the display control system according to the above embodiment is an example, and is not meant to limit the scope defined by the subject matters of the claims; it cannot be overemphasized that there are various examples of system configurations depending on the use and the purpose. For example, display control apparatuses may foe provided in respective sites, the display control apparatuses at the sites may be connected to a server through a network, and the server may execute the processes described above, or the display control apparatuses at the sites may execute the processes described above by distributed processing.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that, the various changes, substitutions, and alterations could be made hereto without departing from the spirit and scope of the invention.

What is claimed is:

1. A display control method for identifying a plurality of objects, comprising:
    obtaining an operation input trajectory to select a plurality of displaying objects among the plurality of objects;
    setting a display area in accordance with the obtained operation input trajectory at specific positions defined by a user; and
    displaying identification information of the plurality of displaying objects on the display area in a predefined order,
    wherein some objects among the plurality of displaying objects are overlapped or hidden behind other objects, and
    wherein the identification information of each of the selected plurality of displaying objects is a thumbnail image corresponding to each of the selected plurality of displaying objects.

2. The display control method according to claim 1, wherein the display area displays the identification information of each of the selected plurality of displaying objects starting from a lowermost layer among the plurality of displaying objects.

3. The display control method according to claim 1, wherein the display area displays the identification information of each of the selected plurality of displaying objects starting from an oldest one in terms of display time among the plurality of displaying objects.

4. The display control method according to claim 1, wherein the display area displays the identification information of each of the selected plurality of displaying objects prioritized for a displaying object being displayed in an area surrounded by the obtained operation input trajectory.

5. A display control apparatus for identifying a plurality of objects, comprising:
    a memory; and
    a processor configured to execute
        obtaining an operation input trajectory to select a plurality of displaying objects among the plurality of objects;
        setting a display area in accordance with the obtained operation input trajectory at specific positions defined by a user; and
        displaying identification information of the plurality of displaying objects on the display area in a predefined order,
        wherein some objects among the plurality of displaying objects are overlapped or hidden behind other objects, and
        wherein the identification information of each of the selected plurality of displaying objects is a thumbnail image corresponding to each of the selected plurality of displaying objects.

6. The display control apparatus according to claim 5, wherein the display area displays the identification information of each of the selected plurality of displaying objects starting from a lowermost layer among the plurality of displaying objects.

7. The display control apparatus according to claim 5, wherein the display area displays the identification information of each of the selected plurality of displaying objects starting from an oldest one in terms of display time among the plurality of displaying objects.

8. The display control apparatus according to claim 5, wherein the display area displays the identification information of each of the selected plurality of displaying objects prioritized for a displaying object being displayed in an area surrounded by the obtained operation input trajectory.

* * * * *